US008413328B2

(12) United States Patent
Yokouchi

(10) Patent No.: US 8,413,328 B2
(45) Date of Patent: Apr. 9, 2013

(54) METHOD OF MANUFACTURING FLOW CHANNEL SUBSTRATE FOR LIQUID EJECTION HEAD

(75) Inventor: Tsutomu Yokouchi, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 419 days.

(21) Appl. No.: 12/683,132

(22) Filed: Jan. 6, 2010

(65) Prior Publication Data

US 2010/0101087 A1 Apr. 29, 2010

Related U.S. Application Data

(62) Division of application No. 12/212,923, filed on Sep. 18, 2008, now Pat. No. 7,814,657.

(30) Foreign Application Priority Data

Sep. 20, 2007 (JP) ................................ 2007-244069

(51) Int. Cl.
*B21D 53/76* (2006.01)
*B23P 17/00* (2006.01)
*B41J 2/015* (2006.01)

(52) U.S. Cl.
USPC ........................................... 29/890.1; 347/20

(58) Field of Classification Search ................. 29/890.1; 347/20, 40, 65
See application file for complete search history.

(56) References Cited

U.S. PATENT DOCUMENTS 5,980,017 A * 11/1999 Sato ................................ 347/20
6,045,214 A * 4/2000 Murthy et al. .................. 347/47
6,482,574 B1 * 11/2002 Ramaswami et al. ........ 430/320
6,540,337 B1 * 4/2003 Pollard ........................... 347/65
6,586,495 B1 * 7/2003 Shimomura et al. .......... 522/112
6,672,712 B1 * 1/2004 Donaldson et al. ............. 347/65
6,682,874 B2 * 1/2004 Ramaswami et al. ........ 430/320
6,713,128 B2 * 3/2004 Shimomura et al. .......... 427/273
6,739,519 B2 * 5/2004 Stout et al. ................. 239/102.2
6,837,572 B2 * 1/2005 Ramaswami et al. .......... 347/47
6,910,760 B2 * 6/2005 Kubota et al. ................... 347/56
7,040,735 B2 * 5/2006 Donaldson et al. ............. 347/44
7,048,358 B2 * 5/2006 Kubota et al. ................... 347/56
7,198,726 B2 * 4/2007 Donaldson et al. ............. 216/27
7,226,149 B2 * 6/2007 Stout et al. ...................... 347/64

(Continued)

FOREIGN PATENT DOCUMENTS

JP 9-193405 A 7/1997
JP 2004-042397 A 2/2004

*Primary Examiner* — David Angwin

(74) *Attorney, Agent, or Firm* — Birch, Stewart, Kolasch & Birch, LLP

(57) ABSTRACT

A method of manufacturing a flow channel substrate, includes the steps of: forming two uneven shapes on a substrate in such a manner that the two uneven shapes follow a liquid flow channel at perimeters of a location where the liquid flow channel is to be formed and the two uneven shapes are configured to prevent a dissolvable resin forming a sacrificial layer from spreading during a heat treatment; forming, between the two uneven shapes on the substrate, the sacrificial layer which is made of the dissolvable resin and has a shape of the liquid flow channel; applying, by the heat treatment, a rounded shape to a corner section of the sacrificial layer on a side which is not in contact with the substrate; forming a coating resin layer on the substrate and the sacrificial layer; patterning the coating resin layer; and dissolving the dissolvable resin forming the sacrificial layer.

20 Claims, 12 Drawing Sheets

U.S. PATENT DOCUMENTS 7,293,859 B2 * 11/2007 Kubota et al. .................. 347/65
7,325,309 B2 * 2/2008 Strand et al. ................. 29/890.1
7,513,601 B2 * 4/2009 Asai et al. ....................... 347/47
7,695,104 B2 * 4/2010 Donaldson et al. ............ 347/44
7,814,657 B2 * 10/2010 Yokouchi ..................... 29/890.1
7,905,576 B2 * 3/2011 Kusunoki ........................ 347/56
7,979,987 B2 * 7/2011 Strand et al. ................. 29/890.1
7,980,675 B2 * 7/2011 Suzuki et al. .................. 347/65
8,191,260 B2 * 6/2012 Kato et al. .................. 29/890.1
8,227,043 B2 * 7/2012 Kubota et al. .............. 427/407.1

* cited by examiner 124
110

112
110
124

112
124
110

112
124
110

112
124
116
110

112
116
110

116
110
120

RELATED ART

METHOD OF MANUFACTURING FLOW CHANNEL SUBSTRATE FOR LIQUID EJECTION HEAD

This application is a Divisional of application Ser. No. 12/212,923 filed on Sep. 18, 2008 now U.S. Pat. No. 7,814,657, and for which priority is claimed under 35 U.S.C. §120; and this application claims priority of Application No. 2007-244069 filed in Japan on Sep. 20, 2007 under 35 U.S.C. §119; the entire contents of all are hereby incorporated by reference.

BACKGROUND OF THE INVENTION

1. Field of the Invention

The present invention relates to a method of manufacturing a flow channel substrate for a liquid ejection head.

2. Description of the Related Art

Conventionally, as an image forming apparatus, an inkjet recording apparatus (inkjet printer) is known, which comprises an inkjet head (liquid ejection head) having an arrangement of a plurality of nozzles for ejecting ink and which forms images on a recording medium by ejecting ink from the nozzles toward the recording medium, while causing the inkjet head and the recording medium to move relatively to each other.

An inkjet head guides ink from an ink tank to ink chambers (pressure chambers) which are connected to nozzles, by means of ink flow channels, and ejects ink from the nozzles by various methods, for instance, by generating a pressure inside the ink chamber.

In this case, if air bubbles which may have entered inside the ink flow channels or which have occurred inside the ink flow channels adhere to positions such as corners of the end portions inside the ink flow channels, then ejection defects may occur since the ink is not supplied correctly.

Therefore, it is sought to form the ink flow channels in such a manner that the air bubbles can be expelled readily rather than adhering to the ink flow channels, even if air bubbles occur inside the ink flow channels.

In response to this, Japanese Patent Application Publication No. 9-193405, for example, discloses technology in which the corners of the cross-sectional shape of the ink flow channels can be formed with a rounded shape rather than an angled shape, in such a manner that the air bubbles are not liable to adhere to the ink flow channels but are removed readily.

In the technology described in Japanese Patent Application Publication No. 9-193405, as shown in (a) of FIG. 12, firstly, a resin layer (sacrificial layer) 504 which can be dissolved by a certain liquid (dissolving liquid) and has a rectangular cross-section is formed as an ink flow channel pattern on a substrate 500 on which a heat-generating resistor 502 is provided. Next, as shown in (b) of FIG. 12, this structure is subjected to heat treatment, and a rounded shape is applied to the corner section of the ink flow channel pattern of the sacrificial layer 504 which is formed in a rectangular shape. Next, a coating resin layer 506 which is not dissolved by the dissolving liquid is formed thereon, an ink ejection port 508 is formed in the portion of the coating resin layer 506 which corresponds to the portion vertically above the heat-generating resistor 502, and finally, the sacrificial layer 504 is dissolved away by the dissolving liquid and an ink flow channel 510 as shown in (c) of FIG. 12 is formed.

However, the technology described in Japanese Patent Application Publication No. 9-193405 entails a problem in that when a rounded shape is applied by means of heat treatment to the corner section of the ink flow channel pattern which is formed in a rectangular shape as the dissolvable resin layer, then the dissolvable resin layer (sacrificial layer) 504 becomes broader, as indicated by the reference symbol δ in (b) of FIG. 12, and hence the width of the portion contacting the substrate 500 changes and the dimensional accuracy becomes worse.

Moreover, since narrow corner sections 512 are formed in the corners of the flow channel 510, as shown in (c) of FIG. 12, due to the broadened portions of the sacrificial layer 504, then the air bubbles in the liquid (ink) tend to stay in these corner sections, the air bubble removal properties become worse, and this adversely affect the ejection of liquid.

SUMMARY OF THE INVENTION

The present invention has been contrived in view of these circumstances, an object thereof being to provide a method of manufacturing a flow channel substrate for a liquid ejection head having a flow channel free of a corner section and having good air bubble removal properties, while maintaining desired dimensional accuracy when forming the flow channel.

In order to attain the aforementioned object, the present invention is directed to a method of manufacturing a flow channel substrate for a liquid ejection head, comprising at least the steps of: forming, on a substrate, a sacrificial layer which is made of a dissolvable resin and has a liquid flow channel shape; forming a lyophobic film on the substrate and the sacrificial layer; applying, by heat treatment, a rounded shape to a corner section of the sacrificial layer on a side which is not in contact with the substrate; removing the lyophobic film after the heat treatment; forming a coating resin layer on the substrate and the sacrificial layer after the lyophobic film is removed; patterning the coating resin layer; and dissolving the sacrificial layer.

In this aspect of the invention, spreading of the dissolvable resin (sacrificial layer) during heat treatment is prevented, and it is possible to apply a rounded shape to a corner section of the flow channel shape formed by the sacrificial layer, on the side which does not contact with the substrate, while maintaining the dimensional accuracy of the flow channel shape. Consequently, it is possible to obtain a liquid flow channel substrate having a flow channel with improved air bubble removal properties.

Desirably, the sacrificial layer is made of a positive resist, the lyophobic film is made of fluoroalkyl silane, and the lyophobic film is removed by means of vacuum ultraviolet light after the heat treatment.

In this aspect of the invention, it is possible to remove the lyophobic film simultaneously with curing the surface of the dissolvable resin layer, simply by radiating vacuum ultraviolet light onto the whole surface of the substrate. This improves the durability of the flow channel shape formed by means of the dissolvable resin layer, as well as improving the processing accuracy during the manufacture of the flow channel.

In order to attain the aforementioned object, the present invention is also directed to a method of manufacturing a flow channel substrate for a liquid ejection head, comprising at least the steps of: forming a groove or wall on a substrate in such a manner that the groove or wall follows a liquid flow channel at a perimeter of a location where the liquid flow channel is to be formed; forming, on a substrate, a sacrificial layer which is made of a dissolvable resin and has a shape of the liquid flow channel; applying, by heat treatment, a rounded shape to a corner section of the sacrificial layer on a side which is not in contact with the substrate; forming a coating resin layer on the substrate and the sacrificial layer; patterning the coating resin layer; and dissolving the sacrificial layer.

In this aspect of the invention, spreading of the dissolvable resin (sacrificial layer) during heat treatment is prevented, and it is possible to apply a rounded shape to a corner section of the flow channel shape formed by the sacrificial layer, on the side which does not contact with the substrate, while maintaining the dimensional accuracy of the flow channel shape. Consequently, it is possible to obtain a liquid flow channel substrate having a flow channel with improved air bubble removal properties.

Desirably, the method of manufacturing a flow channel substrate for a liquid ejection head further comprising the steps of: forming a lyophobic film on the substrate and the sacrificial layer, between the step of forming the sacrificial layer on the substrate and the step of applying the rounded shape to the corner section of the sacrificial layer by the heat treatment; and removing the lyophobic film formed on the substrate and the sacrificial layer, between the step of applying the rounded shape to the corner section of the sacrificial layer by the heat treatment and the step of forming the coating resin layer on the substrate and the sacrificial layer.

In this aspect of the invention, it is possible to prevent spreading of the sacrificial layer during heat treatment, even more reliably, and therefore a rounded shape can be applied to a corner section of the flow channel shape formed by the sacrificial layer, on the side which does not contact with the substrate, while maintaining even better dimensional accuracy of the flow channel shape.

As described above, according to the present invention, spreading of the dissolvable resin (sacrificial layer) during heat treatment is prevented, and it is possible to apply a rounded shape to a corner section of the flow channel shape formed by the sacrificial layer, on the side which does not contact with the substrate, while maintaining the dimensional accuracy of the flow channel shape. Consequently, it is possible to obtain a liquid flow channel substrate having a flow channel with improved air bubble removal properties.

BRIEF DESCRIPTION OF THE DRAWINGS

The nature of this invention, as well as other objects and benefits thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
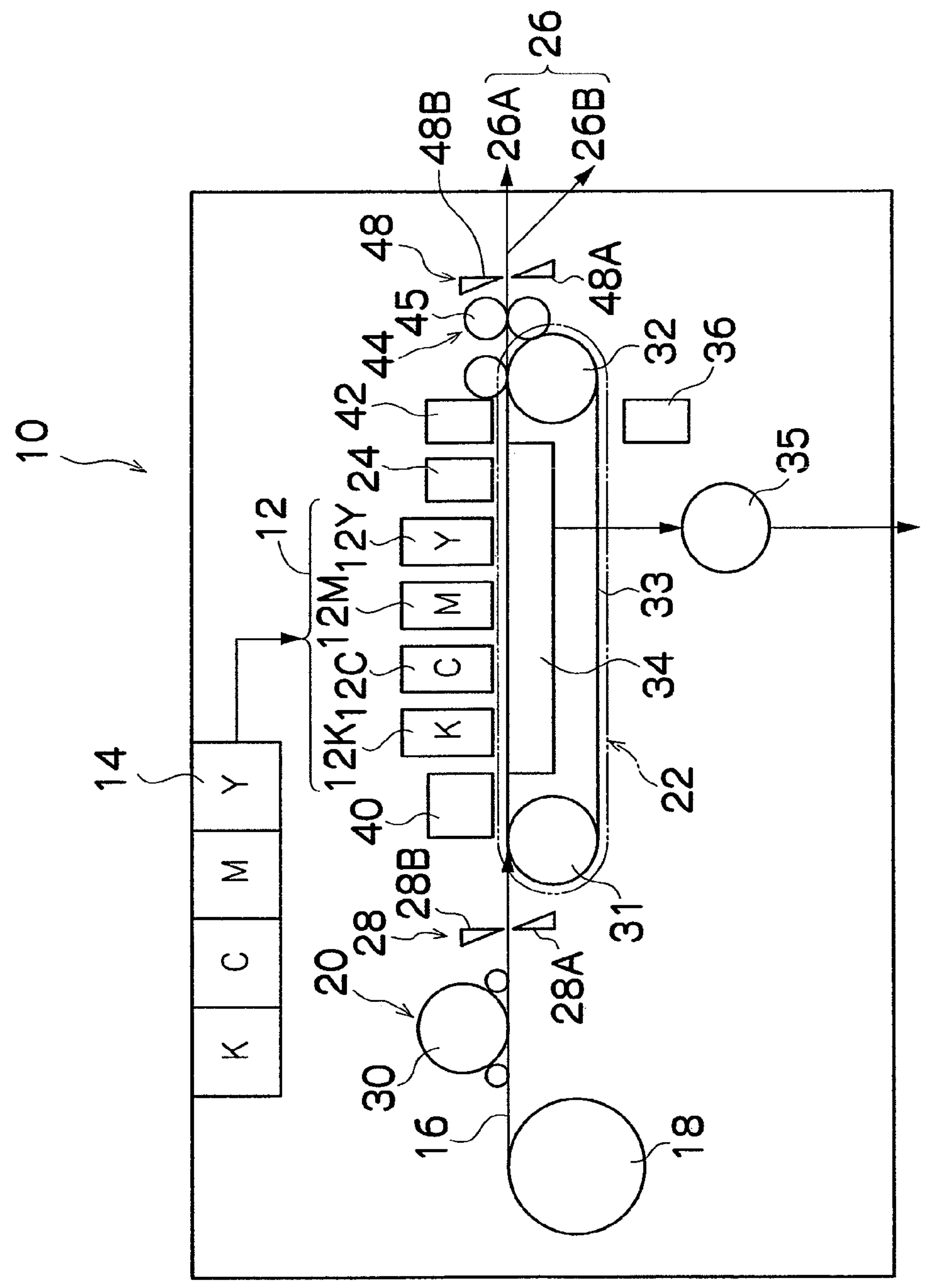
FIG. 1 is a general schematic drawing showing a first embodiment of an inkjet recording apparatus forming an image recording apparatus comprising a liquid ejection head having a flow channel substrate relating to an embodiment of the present invention.

FIG. 1 is a general schematic drawing showing a first embodiment of an inkjet recording apparatus forming an image recording apparatus comprising a liquid ejection head having a flow channel substrate relating to an embodiment of the present invention.

As shown in FIG. 1, the inkjet recording apparatus 10 comprises: a print unit 12 having a plurality of print heads (liquid ejection heads) 12K, 12C, 12M, and 12Y for ink colors of black (K), cyan (C), magenta (M), and yellow (Y), respectively; an ink storing and loading unit 14 for storing inks of K, C, M and Y to be supplied to the print heads 12K, 12C, 12M, and 12Y; a paper supply unit 18 for supplying recording paper 16; a decurling unit 20 for removing curl in the recording paper 16 supplied from the paper supply unit 18; a suction belt conveyance unit 22 disposed facing the nozzle face (the surface of the nozzle plate formed with nozzles for ejecting ink) of the print unit 12, for conveying the recording paper 16 while keeping the recording paper 16 flat; a print detection unit 24 for reading the printed result produced by the print unit 12; and a paper output unit 26 for outputting printed recording paper (printed matter) to the exterior.

In FIG. 1, a magazine for rolled paper (continuous paper) is shown as an example of the paper supply unit 18; however, more magazines with paper differences such as paper width and quality may be jointly provided. Moreover, papers may be supplied with cassettes that contain cut papers loaded in layers and that are used jointly or in lieu of the magazine for rolled paper.

In the case of the configuration in which rolled paper is used, a cutter 28 is provided as shown in FIG. 1, and the rolled paper is cut into a desired size by the cutter 28. The cutter 28 has a stationary blade 28A, whose length is not less than the width of the conveyor pathway of the recording paper 16, and a round blade 28B, which moves along the stationary blade 28A. The stationary blade 28A is disposed on the reverse side of the printed surface, and the round blade 28B is disposed on the printed surface side across the conveyor pathway. When cut papers are used, the cutter 28 is not required.

In the case of a configuration in which a plurality of types of recording paper can be used, it is preferable that an information recording medium such as a bar code and a wireless tag containing information about the type of paper is attached to the magazine, and by reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is preferably controlled so that the recording paper 16 has a curl in which the surface on which the print is to be made is slightly round outward.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the print unit 12 and the sensor face of the print detection unit 24 forms a plane (flat plane).

The belt 33 has a width that is greater than the width of the recording paper 16, and a plurality of suction apertures (not shown) are formed on the belt surface. A suction chamber 34 is disposed in a position facing the sensor surface of the print detection unit 24 and the nozzle surface of the print unit 12 on the interior side of the belt 33, which is set around the rollers 31 and 32, as shown in FIG. 1. The suction chamber 34 provides suction with a fan 35 to generate a negative pressure, and the recording paper 16 on the belt 33 is held by suction.

The belt 33 is driven in the clockwise direction in FIG. 1 by the motive force of a motor (not shown in drawings) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, examples thereof include a configuration in which the belt 33 is nipped with cleaning rollers such as a brush roller and a water absorbent roller, an air blow configuration in which clean air is blown onto the belt 33, and a combination of these. In the case of the configuration in which the belt 33 is nipped with the cleaning rollers, it is preferable to make the line velocity of the cleaning rollers different from that of the belt 33 to improve the cleaning effect.

The inkjet recording apparatus 10 can comprise a roller nip conveyance mechanism, in which the recording paper 16 is pinched and conveyed with nip rollers, instead of the suction belt conveyance unit 22. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the print unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

Figure 2:
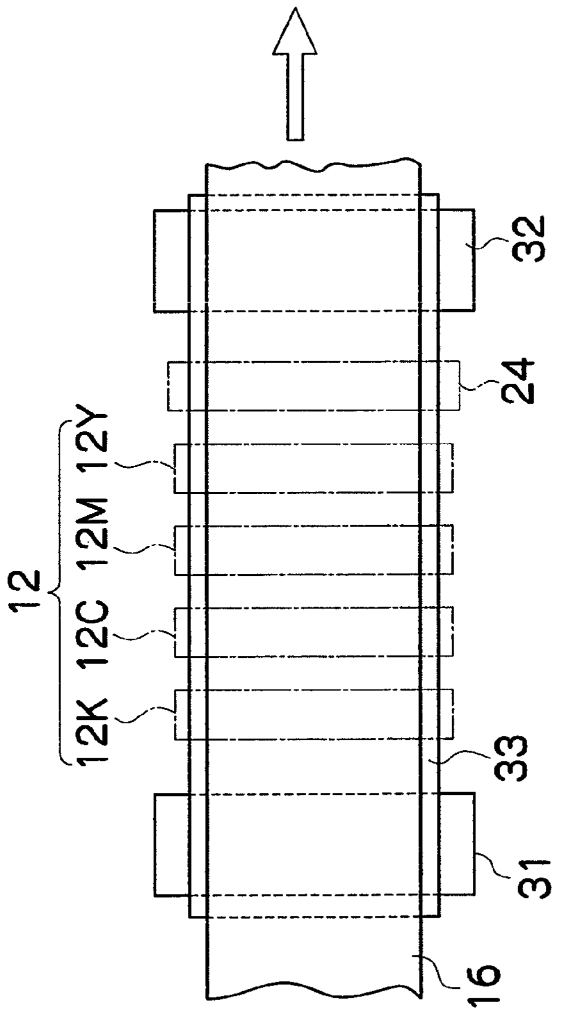
FIG. 2 is a plan view of the principal part of the peripheral area of a print unit in the inkjet recording apparatus shown in FIG. 1.

The print unit 12 is a so-called "full line head" in which a line head having a length corresponding to the maximum paper width is arranged in a direction (main scanning direction) that is perpendicular to the paper conveyance direction (sub-scanning direction) (see FIG. 2).

As shown in FIG. 2, each of the print heads 12K, 12C, 12M, and 12Y is constituted by a line head, in which a plurality of ink ejection ports (nozzles) are arranged over a length that exceeds at least one side of the maximum-size recording paper 16 intended for use in the inkjet recording apparatus 10.

The print heads 12K, 12C, 12M, and 12Y are arranged in the order of black (K), cyan (C), magenta (M), and yellow (Y) from the upstream side (left side in FIG. 1), along the conveyance direction of the recording paper 16 (paper conveyance direction). A color image can be formed on the recording paper 16 by ejecting the inks from the print heads 12K, 12C, 12M, and 12Y, respectively, onto the recording paper 16 while conveying the recording paper 16.

The print unit 12, in which the full-line heads covering the entire width of the paper are thus provided for the respective ink colors, can record an image over the entire surface of the recording paper 16 by performing the action of moving the recording paper 16 and the print unit 12 relative to each other in the paper conveyance direction (sub-scanning direction) just once (in other words, by means of a single sub-scan). Higher-speed printing is thereby made possible and productivity can be improved in comparison with a shuttle type head configuration in which a print head moves reciprocally in a direction (main scanning direction) that is perpendicular to the paper conveyance direction.

Here, the terms "main scanning direction" and "sub-scanning direction" are used in the following senses. More specifically, in a full-line head comprising rows of nozzles that have a length corresponding to the entire width of the recording paper, "main scanning" is defined as printing one line (a line formed of a row of dots, or a line formed of a plurality of rows of dots) in the breadthways direction of the recording paper (the direction perpendicular to the conveyance direction of the recording paper) by driving the nozzles in one of the following ways: (1) simultaneously driving all the nozzles; (2) sequentially driving the nozzles from one side toward the other; and (3) dividing the nozzles into blocks and sequentially driving the blocks of the nozzles from one side toward the other. The direction indicated by one line recorded by a main scanning action (the lengthwise direction of the band-shaped region thus recorded) is called the "main scanning direction".

On the other hand, "sub-scanning" is defined as to repeatedly perform printing of one line (a line formed of a row of dots, or a line formed of a plurality of rows of dots) formed by the main scanning action, while moving the full-line head and the recording paper relatively to each other. The direction in which sub-scanning is performed is called the sub-scanning direction. Consequently, the conveyance direction of the recording paper is the sub-scanning direction and the direction perpendicular to same is called the main scanning direction.

Although a configuration with four standard colors, K C M and Y, is described in the present embodiment, the combinations of the ink colors and the number of colors are not limited to these, and light and/or dark inks can be added as required. For example, a configuration is possible in which print heads for ejecting light-colored inks such as light cyan and light magenta are added.

As shown in FIG. 1, the ink storing and loading unit 14 has ink tanks for storing the inks of the colors corresponding to the respective print heads 12K, 12C, 12M, and 12Y, and the respective tanks are connected to the print heads 12K, 12C, 12M, and 12Y by means of channels (not shown). The ink storing and loading unit 14 has a warning device (for example, a display device, an alarm sound generator, or the like) for warning when the remaining amount of any ink is low, and has a mechanism for preventing loading errors among the colors.

The print detection unit 24 has an image sensor (line sensor or the like) for capturing an image of the ink-droplet deposition result of the print unit 12, and functions as a device to check for ejection defects such as clogs of the nozzles in the print unit 12 from the ink-droplet deposition results evaluated by the image sensor.

The print detection unit 24 of the present embodiment is configured with at least a line sensor having rows of photoelectric transducing elements with a width that is greater than the ink-droplet ejection width (image recording width) of the print heads 12K, 12C, 12M, and 12Y. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements which are arranged two-dimensionally.

The print detection unit 24 reads a test pattern image printed by the print heads 12K, 12C, 12M, and 12Y for the respective colors, and the ejection of each head is determined. The ejection determination includes the presence of the ejection, measurement of the dot size, and measurement of the dot deposition position.

A post-drying unit 42 is disposed following the print detection unit 24. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substances that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is output from the paper output unit 26. The target print (i.e., the result of printing the target image) and the test print are preferably output separately. In the inkjet recording apparatus 10, a sorting device (not shown) is provided for switching the outputting pathways in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly before the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown in the figures, the paper output unit 26A for the target prints is provided with a sorter for collecting prints according to print orders.

Figure 3:
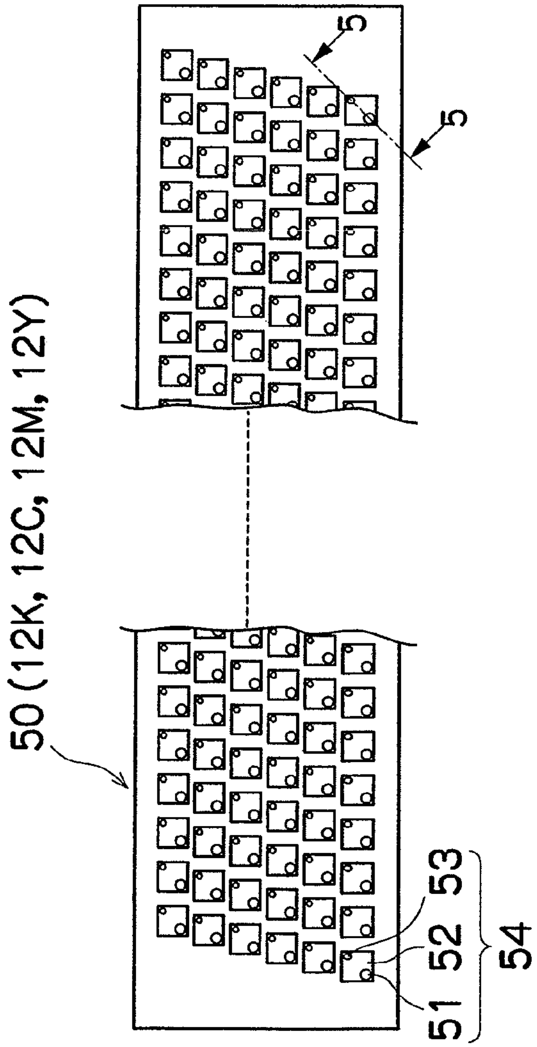
FIG. 3 is a plan perspective diagram showing an example of the structure of a print head.

Next, the arrangement of nozzles (liquid ejection ports) in the print head (liquid ejection head) will be described. The print heads 12K, 12C, 12M and 12Y provided for the respective ink colors each have the same structure, and a print head forming a representative example of these print heads is indicated by the reference numeral 50. FIG. 3 shows a plan view perspective diagram of the print head 50.

As shown in FIG. 3, the print head 50 according to the present embodiment achieves a high density arrangement of nozzles 51 by using a two-dimensional staggered matrix array of pressure chamber units 54, each constituted by a nozzle 51 for ejecting ink as ink droplets, a pressure chamber 52 for applying pressure to the ink in order to eject ink, and an ink supply port 53 for supplying ink to the pressure chamber 52 from a liquid supply chamber (not shown in FIG. 3).

In the example shown in FIG. 3, the pressure chambers 52 each have an approximately square planar shape when viewed from above, but the planar shape of the pressure chambers 52 is not limited to a square shape. As shown in FIG. 3, a nozzle 51 is formed at one end of a diagonal of each pressure chamber 52, and an ink supply port 53 is provided at the other end thereof.

Figure 4:
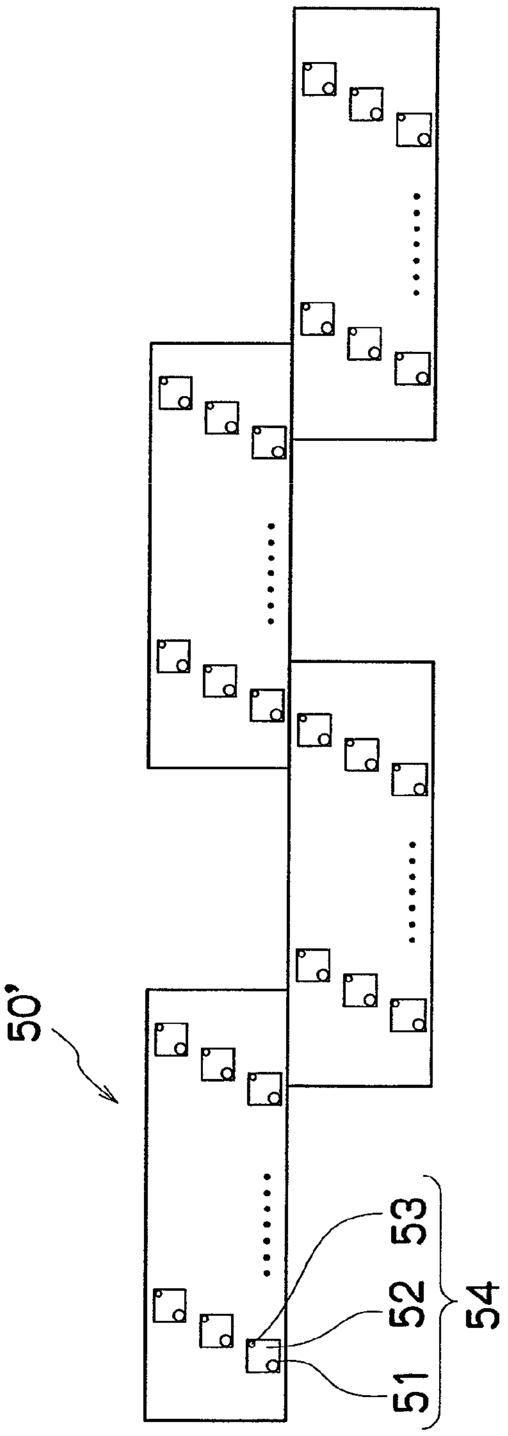
FIG. 4 is a plan view showing a further example of a print head.

Moreover, FIG. 4 is a plan view perspective diagram showing a further example of the structure of a print head. As shown in FIG. 4, one long full line head may be constituted by combining a plurality of short heads 50' arranged in a two-dimensional staggered array, in such a manner that the combined length of this plurality of short heads 50' corresponds to the full width of the print medium.

Figure 5:
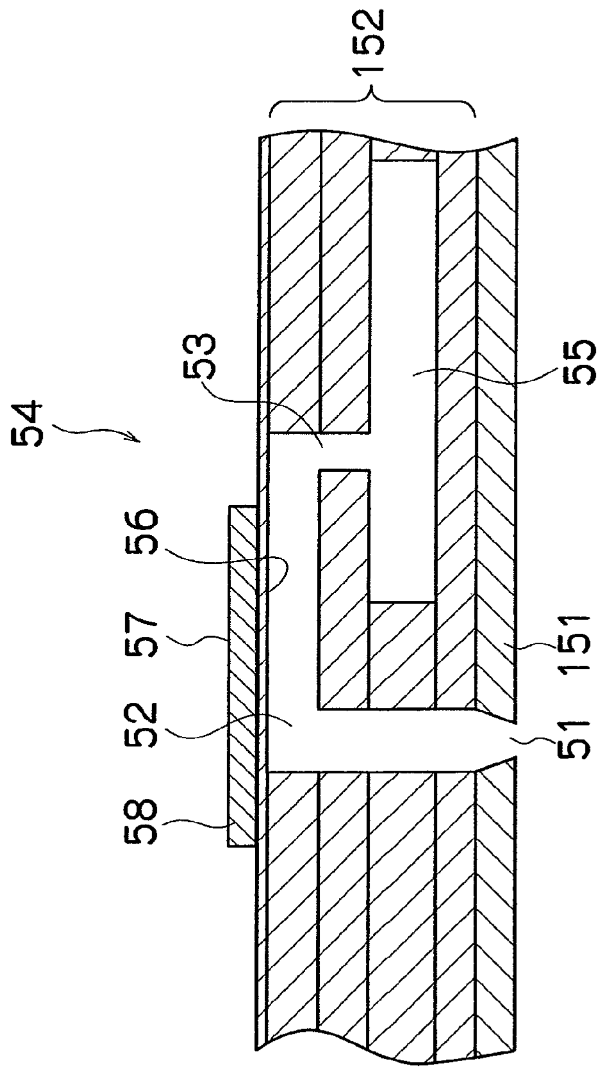
FIG. 5 is a cross-sectional diagram along line 5-5 in FIG. 3.

Furthermore, FIG. 5 shows a cross-sectional diagram along line 5-5 in FIG. 3.

As shown in FIG. 5, a pressure chamber unit 54 comprises a nozzle plate 151 formed with a nozzle 51 for ejecting ink, in the bottommost layer thereof, and on top of this, a flow channel substrate 152 formed with an ink supply flow channel (supply liquid chamber) 55 for supplying ink and a pressure chamber 52.

The pressure chamber units 54 are each formed principally by the nozzle 51 and the pressure chamber 52 connected to same. Furthermore, as well as being connected to the nozzle 51, the pressure chamber 52 is also connected to the supply liquid chamber 55 which supplies ink via an ink supply port 53. Furthermore, one surface (in the diagram, the ceiling) of the pressure chamber 52 is constituted by a diaphragm 56, and a piezoelectric element 58 which causes the diaphragm 56 to deform by applying a pressure to the diaphragm 56 is bonded on top of the diaphragm 56, and an individual electrode 57 is formed on the upper surface of the piezoelectric element 58. Furthermore, the diaphragm 56 also serves as a common electrode.

The piezoelectric element 58 is sandwiched between the common electrode (diaphragm 56) and the individual electrode 57, and it deforms when a drive voltage is applied to these two electrodes 56 and 57. The diaphragm 56 is pressed by the deformation of the piezoelectric element 58, in such a manner that the volume of the pressure chamber 52 is reduced and ink is ejected from the nozzle 51. When the voltage applied between the two electrodes 56 and 57 is released, the piezoelectric element 58 returns to its original position, the volume of the pressure chamber 52 returns to its original size, and new ink is supplied into the pressure chamber 52 from the liquid supply chamber 55 via the supply port 53.

Figure 6:
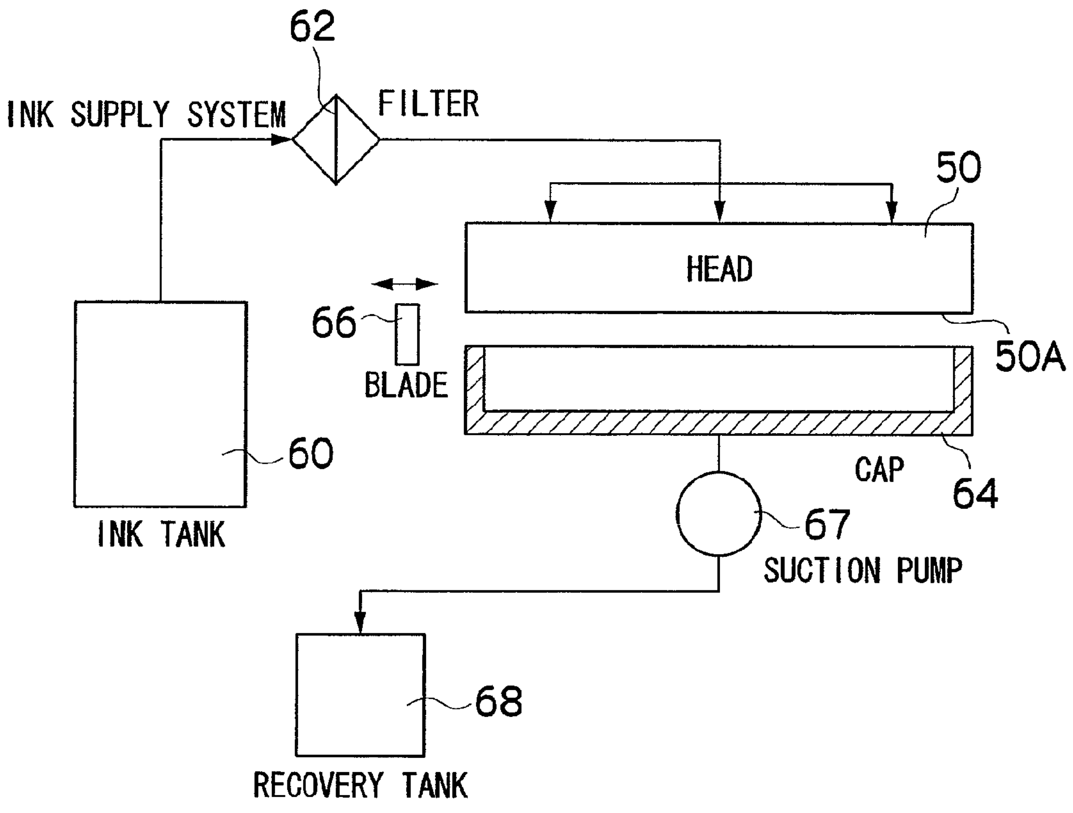
FIG. 6 is a schematic drawing showing the composition of an ink supply system in the inkjet recording apparatus according to an embodiment of the present invention.

FIG. 6 is a schematic drawing showing the configuration of the ink supply system in the inkjet recording apparatus 10. The ink tank 60 is a base tank to supply ink to the print head 50 and is set in the ink storing and loading unit 14 described with reference to FIG. 1. The aspects of the ink tank 60 include a refillable type and a cartridge type: when the remaining amount of ink is low, the ink tank 60 of the refillable type is filled with ink through a filling port (not shown) and the ink tank 60 of the cartridge type is replaced with a new one. In order to change the ink type in accordance with the intended application, the cartridge type is suitable, and it is preferable to represent the ink type information with a bar code or the like, and to perform ejection control in accordance with the ink type. The ink tank 60 in FIG. 6 is equivalent to the ink storing and loading unit 14 in FIG. 1 described above.

A filter 62 for removing foreign matters and bubbles is disposed in the middle of the channel connecting the ink tank 60 and the print head 50 as shown in FIG. 6. The filter mesh size in the filter 62 is preferably equivalent to or not more than the diameter of the nozzle of print head 50 and commonly about 20 μm.

Although not shown in FIG. 6, it is preferable to provide a sub-tank integrally to the print head 50 or nearby the print head 50. The sub-tank has a damper function for preventing variation in the internal pressure of the head and a function for improving refilling of the print head.

The inkjet recording apparatus 10 is also provided with a cap 64 as a device to prevent the nozzles from drying out or to prevent an increase in the ink viscosity in the vicinity of the nozzles, and a cleaning blade 66 as a device to clean the nozzle face 50A (surface of nozzle plate 151).

A maintenance unit including the cap 64 and the cleaning blade 66 can be relatively moved with respect to the print head 50 by a movement mechanism (not shown), and is moved from a predetermined holding position to a maintenance position below the print head 50 as required.

The cap 64 is displaced up and down relatively with respect to the print head 50 by an elevator mechanism (not shown). When the power of the inkjet recording apparatus 10 is turned OFF or when the apparatus is in a standby state for printing, the elevator mechanism raises the cap 64 to a predetermined elevated position so as to come into close contact with the print head 50, and the nozzle region of the nozzle surface 50A is thereby covered by the cap 64.

The cleaning blade 66 is composed of rubber or another elastic member, and can slide on the ink ejection surface (nozzle surface 50A) of the print head 50 by means of a blade movement mechanism (not shown). When ink droplets or foreign matter has adhered to the nozzle surface 50A, the nozzle surface 50A is wiped and cleaned by sliding the cleaning blade 66 on the nozzle surface 50A.

During printing or during standby, if the use frequency of a particular nozzle 51 has declined and the ink viscosity in the vicinity of the nozzle 51 has increased, then a preliminary ejection is performed toward the cap 64, in order to remove the ink that has degraded as a result of increasing in viscosity.

Moreover, when bubbles have become intermixed into the ink inside the print head 50 (the ink inside the pressure chambers 52), the cap 64 is placed on the print head 50, ink (ink in which bubbles have become intermixed) inside the pressure chambers 52 is removed by suction with a suction pump 67, and the ink removed by suction is sent to a recovery tank 68. This suction operation is also carried out in order to suction and remove degraded ink which has hardened due to increasing in viscosity when ink is loaded into the print head for the first time, and when the print head starts to be used after having been out of use for a long period of time.

More specifically, when a state in which ink is not ejected from the head 50 continues for a certain amount of time or longer, the ink solvent in the vicinity of the nozzles 51 evaporates and ink viscosity increases. In such a state, ink can no longer be ejected from the nozzle 51 even if the pressure generating device (not shown, but described hereinafter) for the ejection driving is operated. Before reaching such a state (in a viscosity range that allows ink ejection by the operation of the pressure generating device) the pressure generating device is operated to perform the preliminary discharge to eject the ink whose viscosity has increased in the vicinity of the nozzle toward the ink receptor. After the nozzle surface 50A is cleaned by a wiper such as the cleaning blade 66 provided as the cleaning device for the nozzle surface 50A, a preliminary discharge is also carried out in order to prevent the foreign matter from becoming mixed inside the nozzles 51 by the wiper sliding operation. The preliminary discharge is also referred to as "dummy discharge", "purge", "liquid discharge", and so on.

When bubbles have become intermixed into the nozzle 51 or the pressure chamber 52, or when the ink viscosity inside the nozzle 51 has increased over a certain level, ink can no longer be ejected by the preliminary discharge, and a suctioning action as referred to the above is performed.

More specifically, when bubbles have become intermixed into the ink inside the nozzles 51 and the pressure chambers 52, ink can no longer be ejected from the nozzles 51 even if the laminated pressure generating devices are operated. In a case of this kind, a cap 64 is placed on the nozzle surface 50A of the print head 50, and the ink containing air bubbles or the ink of increased viscosity inside the pressure chambers 52 is suctioned by the pump 67.

However, since this suctioning action is performed with respect to all the ink in the pressure chambers 52, the amount of ink consumption is considerable. Therefore, a preferred aspect is one in which the preliminary discharge is performed when the increase in the viscosity of the ink is small. The cap 64 described with reference to FIG. 6 functions as a suctioning device and it may also function as an ink receptacle for preliminary ejection.

Moreover, desirably, the inside of the cap 64 is divided by means of partitions into a plurality of areas corresponding to the nozzle rows, thereby achieving a composition in which suction can be performed selectively in each of the demarcated areas, by means of a selector, or the like.

Figure 7:
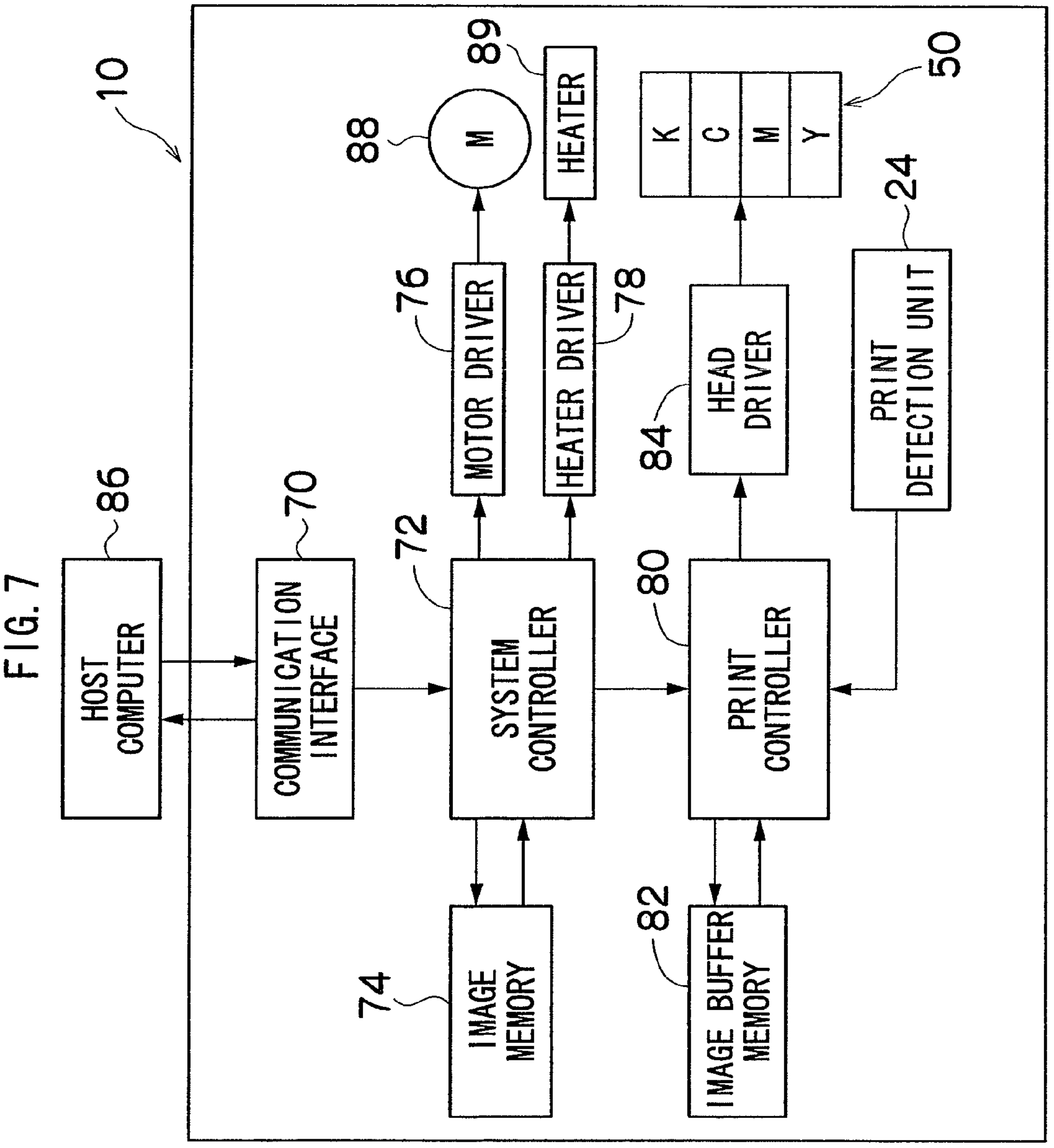
FIG. 7 is a partial block diagram showing the system composition of an inkjet recording apparatus according to an embodiment of the present invention.

FIG. 7 is a principal block diagram showing the system configuration of the inkjet recording apparatus 10.

As shown in FIG. 7, the inkjet recording apparatus 10 comprises a communication interface 70, a system controller 72, an image memory 74, a motor driver 76, a heater driver 78, a print controller 80, an image buffer memory 82, a head driver 84, and the like.

The communication interface 70 is an interface unit for receiving image data sent from a host computer 86. A serial interface such as USB, IEEE1394, Ethernet (registered trademark), wireless network, or a parallel interface such as a Centronics interface may be used as the communication interface 70. A buffer memory (not shown) may be mounted in this portion in order to increase the communication speed. The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to a memory composed of semiconductor elements, and a hard disk drive or another magnetic medium may be used.

The system controller 72 is a control unit for controlling the various sections, such as the communication interface 70, the image memory 74, the motor driver 76, the heater driver 78, and the like. The system controller 72 is constituted by a central processing unit (CPU) and peripheral circuits thereof, and the like, and in addition to controlling communications with the host computer 86 and controlling reading and writing from and to the image memory 74, and the like, it also generates control signals for controlling the motor 88 of the conveyance system and the heater 89.

The motor driver 76 is a driver (drive circuit) that drives the motor 88 in accordance with commands from the system controller 72. The heater driver 78 drives the heater 89 of the post-drying unit 42 and the like in accordance with commands from the system controller 72.

The print controller 80 has a signal processing function for performing various tasks, compensations, and other types of processing for generating print control signals from the image data stored in the image memory 74 in accordance with the control of the system controller 72 so as to supply the generated print control signals (print data) to the head driver 84. Required signal processing is carried out in the print controller 80, and the ejection amount and the ejection timing of the ink droplets from the respective print heads 50 are controlled via the head driver 84, on the basis of the print data. By this means, desired dot size and dot positions can be achieved.

The print controller 80 is provided with the image buffer memory 82; and image data, parameters, and other data are temporarily stored in the image buffer memory 82 when image data is processed in the print controller 80. The aspect shown in FIG. 7 is one in which the image buffer memory 82 accompanies the print controller 80; however, the image memory 74 may also serve as the image buffer memory 82. Also possible is an aspect in which the print controller 80 and the system controller 72 are integrated to form a single processor.

The head driver 84 drives the pressure generating devices of the print head 50 of the respective colors on the basis of print data supplied by the print controller 80. The head driver 84 can be provided with a feedback control system for maintaining constant drive conditions for the print heads.

The print detection unit 24 is a block that includes the line sensor (not shown) as described above with reference to FIG. 1, reads the image printed on the recording paper 16, determines the print conditions (presence of the ejection, variation in the dot formation, and the like) by performing required signal processing, and the like, and provides the determination results of the print conditions to the print controller 80.

According to requirements, the print controller 80 makes various corrections with respect to the print head 50 on the basis of information obtained from the print detection unit 24.

Below, a method of manufacturing a flow channel substrate according to an embodiment of the present invention will be described. As described above with reference to FIG. 5, the ink supply flow channel and the pressure chamber are formed in the flow channel substrate, and here, the liquid flow channel includes the pressure chamber, and the like, as well as the so-called (ink) flow channel. The description given below does not specify in particular the kind of flow channel that is formed in the flow channel substrate.

FIGS. 8A to 8I show steps of a method of manufacturing a flow channel substrate relating to a first embodiment of the present invention.

Figure 8A:
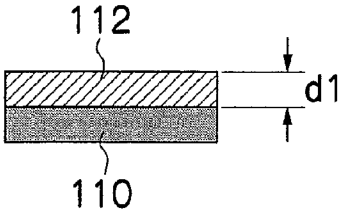
FIGS. 8A to 8I are step diagrams showing a method of manufacturing a flow channel substrate relating to a first embodiment.

Firstly, as shown in FIG. 8A, a layer (sacrificial layer) 112 which is to form a mold for a flow channel is applied using a resin which can be dissolved by a dissolving liquid, on the substrate 110 which is made of silicone, a metal such as stainless steel, a resin, or the like. This sacrificial layer 112 is formed to a thickness d1 of 10 to 50 μm. There are no particular restrictions on the method of forming the sacrificial layer 112; for example, it can be formed by spin coating, spray coating, or the like. Moreover, a positive type of resist is used for the sacrificial layer 112. In this case, it is possible to carry out patterning by exposure and development, and the resist can be removed easily.

Figure 8B:
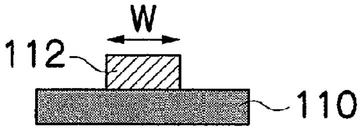

Next, as shown in FIG. 8B, a mold (flow channel shape) for the portion which is to create a flow channel (where the ink is actually to flow) is formed by patterning the sacrificial layer 112. This mold is patterned to a rectangular shape as shown in FIG. 8B, but the width W of this mold varies depending on the kind of ink flow channel that is being formed. For example, if the flow channel thus formed is to create a pressure chamber section, the width W is formed to 20 to 100 μm, and in cases of other kinds of the flow channel, it is formed to 5 to 500 μm. Moreover, there are no particular restrictions on the patterning method used, but for example, it is also possible to carry out patterning by using a photosensitive resin (resist) and performing exposure and development.

Figure 8C:
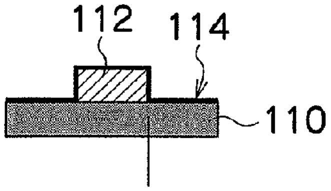

Next, as shown in FIG. 8C, a lyophobic film 114 is formed on the substrate 110 and the patterned sacrificial layer 112. The lyophobic film 114 can be formed by various methods, such as spin coating, spray coating, vapor deposition, and the like. A material which can be removed at a later stage can be used for the lyophobic film 114. For example, a fluorine resin, fluoroalkyl silane, and the like, can be used for the lyophobic film 114. These can be removed by oxygen plasma processing, or by irradiation of vacuum ultraviolet light.

Figure 8D:
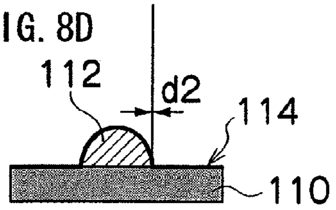

Next, as shown in FIG. 8D, heat treatment is carried out in such a manner that a rounded shape is applied to the corner section of patterned sacrificial layer 112 on the side which does not contact with the substrate 110. Desirably, this rounded shape is a shape having a radius of curvature which is not less than the radius of the air bubbles which may become mixed into the flow channel or which may occur inside the flow channel. For example, in the case of a pressure chamber, this depends on the shape of the pressure chamber and the properties (viscosity) of the liquid (ink), and the like, but even air bubbles having a diameter of 5 to 10 μm affect ejection performance. Therefore, if the air bubble expulsion properties are also to be taken into account, then the air bubble expulsion properties created by the flow of liquid are improved by forming a pressure chamber having a corner radius not less than the radius of the air bubbles. More specifically, if the diameter of the air bubbles is 5 μm, then the corner radius should be set to not less than 2.5 μm.

An oven, hot plate, or the like, is used for the heat treatment. The heat treatment temperature depends on the material used for the sacrificial layer 112, but for example, it is heated to approximately 100° C. to 120° C. In the present embodiment, since the lyophobic film 114 is formed by the previous step as described above, the sacrificial layer 112 does not spread laterally over the substrate 110 as a result of the heat treatment step. In other words, in FIG. 8D, the amount of displacement d2 when a rounded shape is applied to the pattern having a rectangular shape is substantially zero.

Figure 8E:
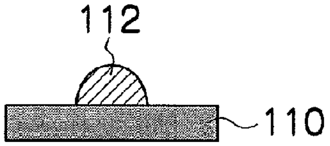

Next, as shown in FIG. 8E, the lyophobic film 114 is removed.

Figure 8F:
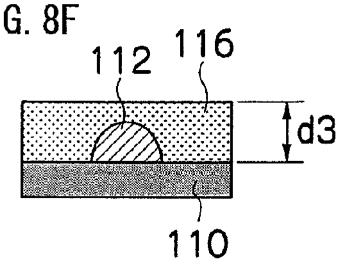

Next, as shown in FIG. 8F, a coating resin layer 116 is formed on the substrate 110 and the sacrificial layer 112. The coating resin layer 116 can be formed by spin coating or spray coating. The thickness d3 of the coating resin layer 116 also depends on the thickness d1 of the sacrificial layer 112, but it is formed, for example, to 25 to 150 μm.

Thereupon, the coating resin layer 116 is patterned. The portion formed by this patterning step varies depending on whether the flow channel is to form a pressure chamber section, or to form a flow channel of another kind. If the flow channel to be formed is a pressure chamber, then an ink flow channel connected to a nozzle is patterned, and if the flow channel to be formed is another kind of flow channel, such as a supply liquid chamber, then an ink flow channel connected to a supply port which supplies ink from the flow channel to the pressure chamber, for example, or the like, is patterned.

Figure 8G:
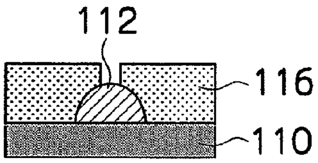
Figure 8H:
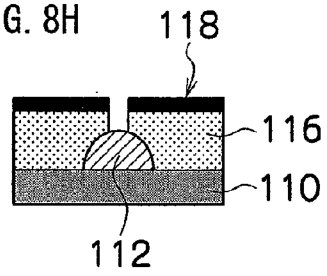

There are no particular restrictions on the method of patterning the coating resin layer 116, and if the coating resin layer 116 is a photosensitive resin as shown in FIG. 8G for example, then it can be patterned by exposure and development. Alternatively, as shown in FIG. 8H, it is also possible to create a mask 118 by forming and patterning a mask layer on the coating resin layer 116, then pattern the coating resin layer 116 by dry etching, or the like, and subsequently remove the mask 118.

Figure 8I:
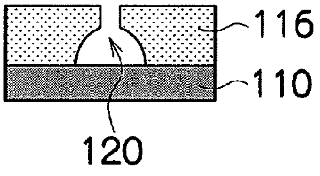

Finally, as shown in FIG. 8I, the sacrificial layer 112 is removed by immersing the sacrificial layer 112 in a liquid which can dissolve the resin of the sacrificial layer 112, thereby forming a flow channel 120.

As described above, in the present embodiment, by forming the lyophobic film 114 on the patterned sacrificial layer 112, it is possible to prevent spreading of the sacrificial layer 112 during the heat treatment. In the related art which is described above, it is considered that the patterned sacrificial layer spreads by approximately several μm during the heat treatment, but in the method according to the present embodiment, this spreading is substantially zero. Consequently, it is possible to apply a rounded shape to the corners while maintaining desired dimensional accuracy.

Concerning the flow channel substrate having a flow channel formed in this way, even if air bubbles become introduced into the flow channel or if air bubbles occur inside the flow channel, since there are no corner section in the edge portions of the flow channel, the air bubbles do not adhere and stagnate in the flow channel, but rather can be removed easily.

Next, a second embodiment of a method of manufacturing the flow channel substrate according to the present invention will be described.

The second embodiment is substantially the same as the first embodiment described above, but it differs in that vacuum ultraviolet light irradiation is used for removing the lyophobic film 114 in transferring from FIGS. 8D and 8E.

In other words, in the second embodiment, positive resist is used for the sacrificial layer 112 such as a PMER P-LA900PM made by Tokyo Ohka Kogyo Co., Ltd. or an AZ10-XT made by AZ Electronic Materials., fluoroalkylsilane is used for the lyophobic film 114, and vacuum ultraviolet light is used for removing the lyophobic film 114.

Apart from the removal of the lyophobic film 114, the second embodiment is the same as the first embodiment, and therefore only the removal of the lyophobic film 114 is described here.

Figure 9A:
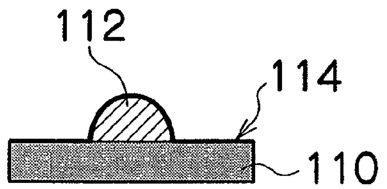
FIGS. 9A to 9C are step diagrams showing a method of manufacturing a flow channel substrate relating to a second embodiment.
Figure 9B:
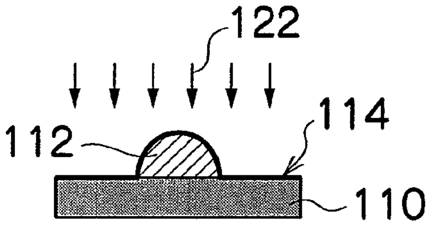
Figure 9C:
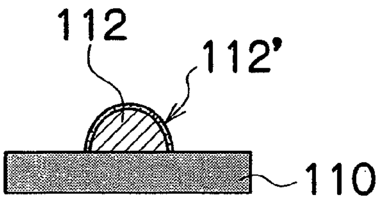

FIGS. 9A to 9C show steps for removing the lyophobic film 114 according to the second embodiment.

Firstly, as shown in FIG. 9A, similarly to FIGS. 8A to 8D illustrating the first embodiment, the sacrificial layer 112 of positive resist is patterned on the substrate 110, a lyophobic film 114 is formed thereon, and heat treatment is carried out to apply a rounded shape to the corner sections of the patterned sacrificial layer 112, on the side which does not make contact with the substrate 110.

Thereupon, as shown in FIG. 9B, the whole of the substrate 110 which is placed in vacuum is irradiated with vacuum ultraviolet light 122, from above. Ultraviolet light having a wavelength of 150 to 300 nm is used as the vacuum ultraviolet light 122. If irradiation is carried out in air, then the light is absorbed by the air and does not reach the target object. Therefore, irradiation of the ultraviolet light is carried out in a vacuum.

Due to the irradiation of vacuum ultraviolet light 122, as shown in FIG. 9C, the lyophobic film 114 is removed and simultaneously, the surface layer 112' of the sacrificial layer 112 is also cured. By curing the surface layer 112' of the sacrificial layer 112 in this way, the durability of the sacrificial layer 112 is improved. Consequently, it is possible to prevent dissolution of the sacrificial layer 112 by the coating resin layer 116 or the solvent contained therein, during formation of the coating resin layer 116. Furthermore, since the curing process progresses only in the surface layer 112' of the sacrificial layer 112, then it is possible to remove the sacrificial layer 112 by means of a dissolving liquid.

Therefore, it is sufficient to radiate vacuum ultraviolet light 122 onto the whole surface of the substrate 110, and beneficial effects are obtained both in terms of removing the lyophobic film 114 and in terms of curing the surface layer 112' of the sacrificial layer 112.

After removing the lyophobic film 114, similarly to the first embodiment, the coating resin layer is formed thereon, the coating resin layer is patterned, the sacrificial layer is dissolved out and a flow channel is formed.

Next, a third embodiment of the present invention will be described.

In the third embodiment, an undulating shape (groove/wall) is formed at the perimeter of the sacrificial layer pattern, and this serves to prevent spreading of the sacrificial layer pattern during heat treatment.

FIGS. 10A to 10G show an example of a case where recess shape grooves are formed, and FIGS. 11A to 11G show an example of a case where projecting shape walls are formed.

Figures 10A, 10B, 10C, 10D, 10E, 10F, 10G:
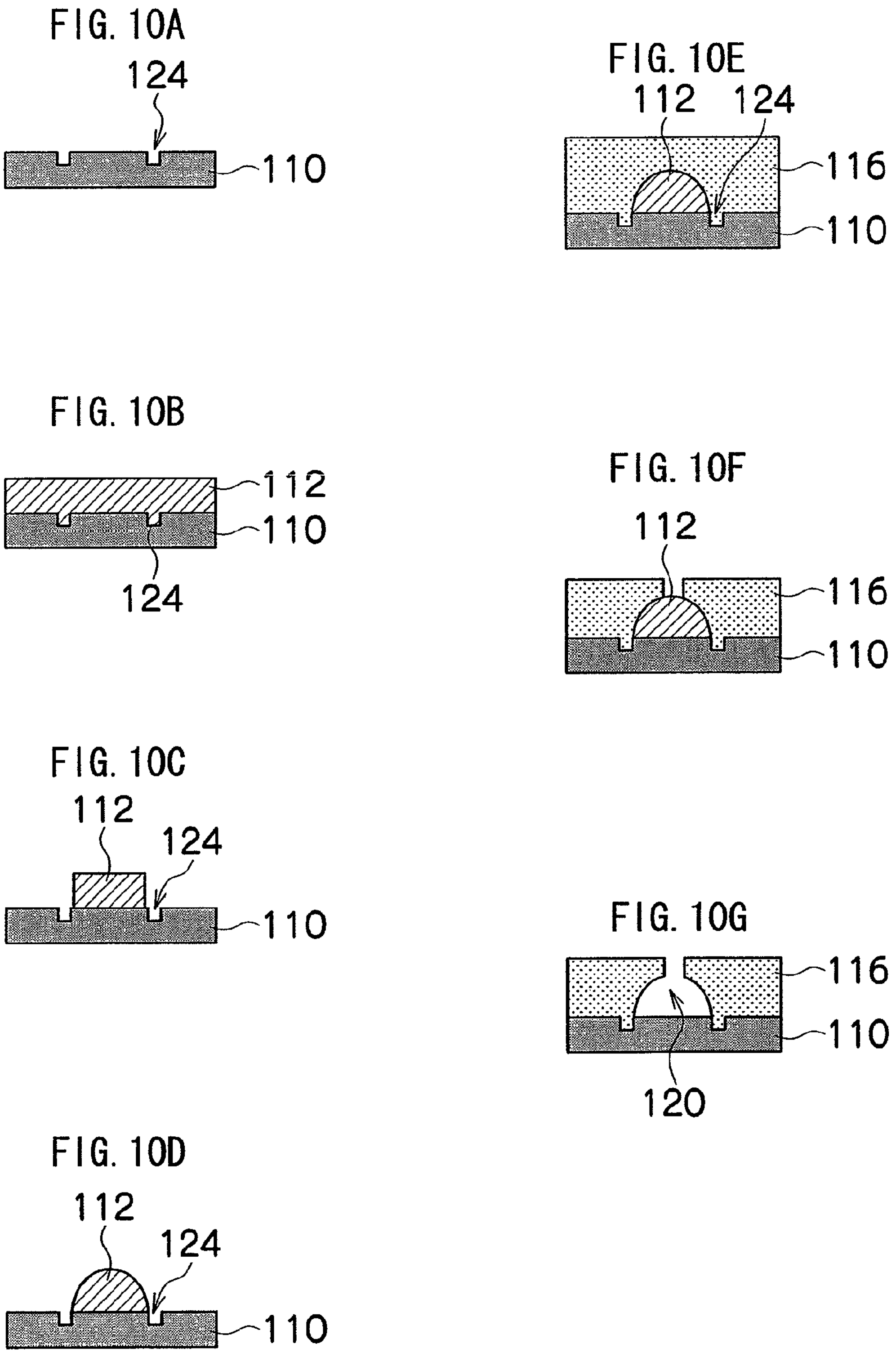
FIGS. 10A to 10G are step diagrams showing one example of a method of manufacturing a flow channel substrate relating to a third embodiment.

If a recess shape is formed, then firstly, as shown in FIG. 10A, recess shape grooves 124 are formed following the pattern, about the perimeter of the sacrificial layer to be patterned on the substrate 110. There are no particular restrictions on the method of forming the grooves 124, but it is possible, for example, to form the grooves by excavating the substrate by a dry etching or wet etching method, or the like. From the viewpoint of preventing spreading of the sacrificial layer 112 during heat treatment, it is desirable that the corner section of the recess should have a right-angled or acute-angled shape.

Thereupon, as shown in FIG. 10B, a sacrificial layer 112 is formed on the substrate 110 in which the grooves 124 have been formed. This can be done by spin coating, spray coating, or the like, similarly to the first embodiment which is described above.

Next, as shown in FIG. 10C, the sacrificial layer 112 is patterned and a mold for creating a flow channel is formed.

Next, as shown in FIG. 10D, heat treatment is carried out, thereby applying a rounded shape to the corner sections of the patterned sacrificial layer 112 on the side which does not contact with the substrate 110. In this case, since the grooves 124 have been formed, then it is possible to prevent spreading of the sacrificial layer 112.

After patterning the sacrificial layer 112 as illustrated in FIG. 10C, it is possible to form a lyophobic film over the whole surface, and then carry out heat treatment. If the lyophobic film is formed, then due to combined effects of the grooves 124 and the lyophobic film, it is possible to prevent spreading of the sacrificial layer 112 even more reliably. If the lyophobic film is formed, then this lyophobic film is removed before the subsequent step of forming a coating resin layer.

Next, as shown in FIG. 10E, a coating resin layer 116 is formed on the substrate 110 and the pattern of the sacrificial layer 112. This can also be formed by spin coating or spray coating.

Next, as shown in FIG. 10F, the coating resin layer 116 is patterned. Similarly to the first embodiment which is described above, this patterning may be carried out by exposure and development, or alternatively, it is also possible to create a mask by forming and patterning a mask layer on the coating resin layer 116, and to then pattern the coating resin layer 116 by dry etching, or the like, and subsequently remove the mask.

Next, as shown in FIG. 10G, the sacrificial layer 112 is removed by immersing the resin of the sacrificial layer 112 in a liquid which can dissolve the resin, thereby forming a flow channel 120.

Next, a case where a projecting shape wall is formed will be described. FIGS. 11A to 11G show an example of a case where a projecting shape wall is formed.

Figure 11A:
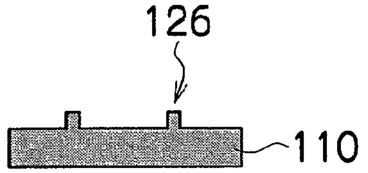
FIGS. 11A to 11G are step diagrams showing a further example of a method of manufacturing a flow channel substrate relating to the third embodiment.

If a projecting shape wall is formed, then firstly, as shown in FIG. 11A, projecting shape walls 126 are formed on the substrate 110. There are no particular restrictions on the method of forming the walls 126, and they may be formed by excavating the portions other than the projecting shape walls on the substrate 110, by means of dry etching or wet etching. However, since this method wastes the substrate 110 because of the substrate 110 having a large area, then a desirable method is one where projecting sections are formed by a different material. For example, a dry film resist may be put (laminating), and then exposed and developed. Moreover, from the viewpoint of preventing spreading of the sacrificial layer 112 during heat treatment, it is desirable that the corner sections of each projection should have a right-angled or acute-angled shape.

Figure 11B:
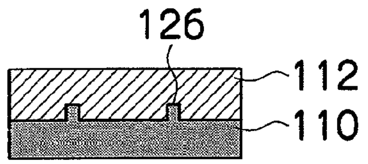

Thereupon, as shown in FIG. 11B, a sacrificial layer 112 is formed by spin coating or spray coating, or the like, on the substrate 110 on which the walls 126 have been formed.

Figure 11C:
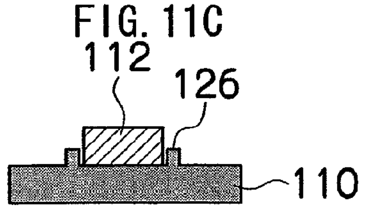

Next, as shown in FIG. 11C, the sacrificial layer 112 is patterned and a mold for a flow channel is formed.

Figure 11D:
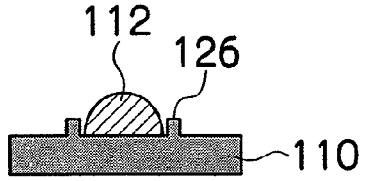

Next, as shown in FIG. 11D, heat treatment is carried out, thereby applying a rounded shape to the corner sections of patterned sacrificial layer 112 on the side which does not contact with the substrate 110. In this case, since the walls 126 have been formed, then it is possible to prevent spreading of the sacrificial layer 112.

After patterning the sacrificial layer 112 as illustrated in FIG. 11C, it is possible to form a lyophobic film over the whole surface, and then carry out heat treatment. If the lyophobic film is formed, then due to combined effects of the walls 126 and the lyophobic film, it is possible to prevent spreading of the sacrificial layer 112 even more reliably. If the lyophobic film is formed, then this lyophobic film is removed before the subsequent step of forming a coating resin layer.

Figure 11E:
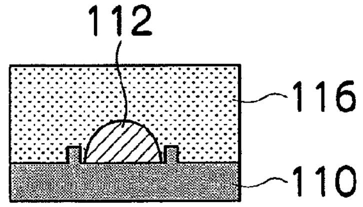

Next, as shown in FIG. 11E, a coating resin layer 116 is formed by spin coating or spray coating on the substrate 110 and the pattern of the sacrificial layer 112.

Figure 11F:
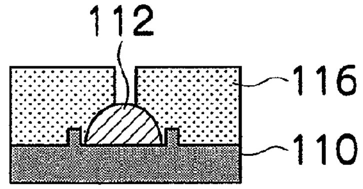

Next, as shown in FIG. 11F, the coating resin layer 116 is patterned. Similarly to the first embodiment which is described previously, this patterning may be carried out by exposure and development, or alternatively, this patterning may be carried out by creating a mask by forming and patterning a mask layer on the coating resin layer 116, and then patterning the coating resin layer 116 by dry etching, or the like, and subsequently removing the mask.

Figure 11G:
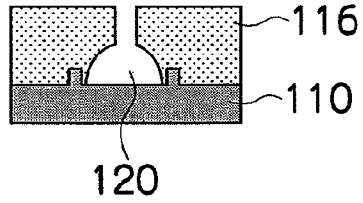
Figure 12:
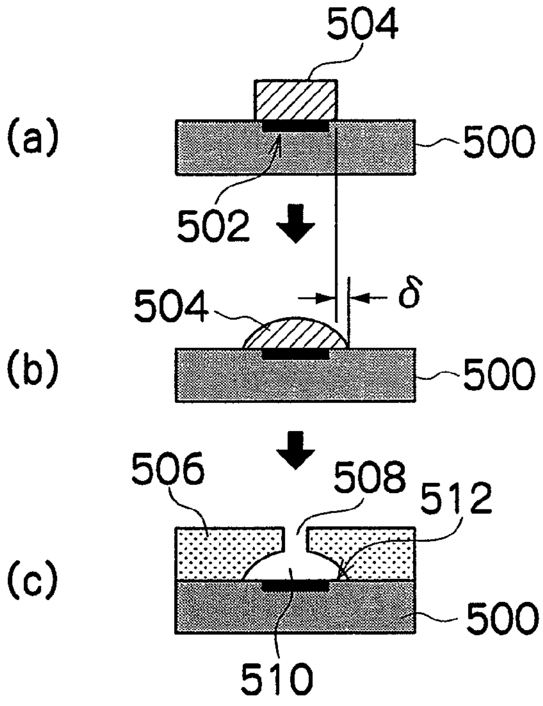
FIG. 12 illustrates a step diagram showing a method of manufacturing a flow channel substrate according to the related art.

Next, as shown in FIG. 11G, the sacrificial layer 112 is removed by immersing the resin of the sacrificial layer 112 in a liquid which can dissolve the resin, thereby forming a flow channel 120.

In this way, in the third embodiment, spreading of the sacrificial layer during heat treatment is prevented by forming an undulating shape, or combining same with the application of a lyophobic film. Although the sacrificial layer is formed after forming an undulating shape in all of the examples described above, it is also possible to form the undulating shape after forming the sacrificial layer. However, if an undulating shape is formed after forming the sacrificial layer, then there is a possibility that the process of forming the undulating shape may cause damage to the sacrificial layer, and therefore, it is desirable to form an undulating shape before forming the sacrificial layer.

Desirably, the undulating shape has a width and depth (height) of approximately 0.5 to 5 μm, for example. This is because if the width is too large, then it is difficult to achieve high density of the flow channels. Furthermore, if the depth (height) is too great, then the process of forming the undulating shape takes a long time, and therefore efficiency becomes poor. Furthermore, if, conversely, the width or depth (height) is too small, then beneficial effects in suppressing the spreading are not obtained.

In order to find an optimum value, it is necessary to determine these dimensions of the undulating shape by taking account of the viscosity and surface tension of the material of the sacrificial layer, and the type of substrate, and so on.

Moreover, it is also desirable that the interval between the undulating shapes should be slightly greater than the width of the sacrificial layer. This is in order that, even if the position is displaced during patterning of the sacrificial layer, the patterned shape of the sacrificial layer will still enter between the undulating shapes. However, the difference by which the interval is made larger than the width of the sacrificial layer depends on the positional accuracy of the apparatus, and the like, and desirably this difference is small, for to example, approximately 0.1 to 1 μm.

In this way, according to the present embodiment, it is possible to prevent spreading of the sacrificial layer during heat treatment, by the effects of the undulating shape, or the effects of this shape in combination with a lyophobic film, and therefore it is possible to apply a rounded shape to the corner section of the pattern in the sacrificial layer which forms a mold for a flow channel, while ensuring a desired dimensional accuracy.

Moreover, another beneficial effect of forming an undulating shape lies in the fact that since the undulating shape and the coating resin layer are mutually interlocking, then this enhances the adhesiveness of the coating resin layer to the substrate.

In this way, according to the present embodiment, it is possible to manufacture a flow channel substrate having excellent air bubble removal properties.

Methods of manufacturing a flow channel substrate for a liquid ejection head according to the present invention have been described in detail above, but the present invention is not limited to the aforementioned examples, and it is of course possible for improvements or modifications of various kinds to be implemented, within a range which does not deviate from the essence of the present invention.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of manufacturing a flow channel substrate for a liquid ejection head, comprising the steps of:

forming two uneven shapes on a substrate in such a manner that the two uneven shapes follow a liquid flow channel at perimeters of a location where the liquid flow channel is to be formed and the two uneven shapes are configured to prevent a dissolvable resin forming a sacrificial layer from spreading during a heat treatment;

forming, between the two uneven shapes on the substrate, the sacrificial layer which is made of the dissolvable resin and has a shape of the liquid flow channel;

applying, by the heat treatment, a rounded shape to a corner section of the sacrificial layer on a side which is not in contact with the substrate;

forming a coating resin layer on the substrate and the sacrificial layer;

patterning the coating resin layer; and dissolving the dissolvable resin forming the sacrificial layer.

2. The method as defined in claim 1, further comprising the steps of:

forming a lyophobic film on the substrate and the sacrificial layer, between the step of forming the sacrificial layer on the substrate and the step of applying the rounded shape to the corner section of the sacrificial layer by the heat treatment; and removing the lyophobic film formed on the substrate and the sacrificial layer, between the step of applying the rounded shape to the corner section of the sacrificial layer by the heat treatment and the step of forming the coating resin layer on the substrate and the sacrificial layer.

3. The method as defined in claim 1, wherein the step of forming the uneven shapes on the substrate is previous to the step of forming the sacrificial layer on the substrate.

4. The method as defined in claim 1, wherein the step of forming the sacrificial layer on the substrate is previous to the step of forming the uneven shapes on the substrate.

5. The method as defined in claim 1, wherein a width of the sacrificial layer formed on the substrate is smaller than a distance of the two uneven shapes formed on the substrate between which the sacrificial layer is formed.

6. The method as defined in claim 5, wherein the width of the sacrificial layer is smaller than the distance of the two uneven shapes by an extent not smaller than 0.1 μm and not larger than 1 μm.

7. The method as defined in claim 1, wherein:

at least one of the two uneven shapes includes a groove formed on the substrate; and the groove prevents the dissolvable resin forming the sacrificial layer from spreading during the heat treatment.

8. The method as defined in claim 7, wherein the step of forming the uneven shapes includes the step of forming the groove on the substrate by dry etching.

9. The method as defined in claim 7, wherein the step of forming the uneven shapes includes the step of forming the groove on the substrate by wet etching.

10. The method as defined in claim 7, wherein the groove formed on the substrate has a nonobtuse corner section.

11. The method as defined in claim 7, wherein the groove formed on the substrate has a width of not smaller than 0.5 μm and not larger than 5 μm.

12. The method as defined in claim 7, wherein the groove formed on the substrate has a depth of not smaller than 0.5 μm and not larger than 5 μm.

13. The method as defined in claim 1, wherein:

at least one of the two uneven shapes includes a wall formed on the substrate; and the wall prevents the dissolvable resin forming the sacrificial layer from spreading during the heat treatment.

14. The method as defined in claim 13, wherein the step of forming the uneven shapes includes the step of forming the wall on the substrate by dry etching.

15. The method as defined in claim 13, wherein the step of forming the uneven shapes includes the step of forming the wall on the substrate by wet etching.

16. The method as defined in claim 13, wherein the step of forming the uneven shapes includes the step of forming the wall on the substrate by putting a material on the substrate.

17. The method as defined in claim 16, wherein the step of forming the wall includes the steps of:

putting a dry film resist on the substrate; and exposing and developing the dry film resist to form the wall.

18. The method as defined in claim 13, wherein the wall formed on the substrate has a nonobtuse corner section.

19. The method as defined in claim 13, wherein the wall formed on the substrate has a width of not smaller than 0.5 μm and not larger than 5 μm.

20. The method as defined in claim 13, wherein the wall formed on the substrate has a height of not smaller than 0.5 μm and not larger than 5 μm.

* * * * *